United States Patent
Jiang et al.

(10) Patent No.: US 8,392,815 B2
(45) Date of Patent: Mar. 5, 2013

(54) METHOD FOR THE OPERATION OF A MICROCONTROLLER AND AN EXECUTION UNIT AND MICROCONTROLLER AND AN EXECUTION UNIT

(75) Inventors: Zheng-Yu Jiang, Regensburg (DE);
Horst Geib, Gau-Algesheim (DE);
Dietmar Schmid, Villmar (DE)

(73) Assignee: Continental Automotive GmbH, Hannover (DE)

( * ) Notice: Subject to any disclaimer, the term of this patent is extended or adjusted under 35 U.S.C. 154(b) by 412 days.

(21) Appl. No.: 12/666,695

(22) PCT Filed: May 20, 2008

(86) PCT No.: PCT/EP2008/056162
§ 371 (c)(1),
(2), (4) Date: Dec. 24, 2009

(87) PCT Pub. No.: WO2009/000602
PCT Pub. Date: Dec. 31, 2008

(65) Prior Publication Data
US 2010/0192052 A1    Jul. 29, 2010

(30) Foreign Application Priority Data
Jun. 25, 2007    (DE) .......................... 10 2007 029 116

(51) Int. Cl.
*G06F 11/10*    (2006.01)
(52) U.S. Cl. .......................................... 714/807; 714/15
(58) Field of Classification Search .................. 714/807, 714/15
See application file for complete search history.

(56) References Cited

U.S. PATENT DOCUMENTS

| | | | |
|---|---|---|---|
| 3,753,227 A * | 8/1973 | Patel .............................. | 714/805 |
| 5,016,249 A | 5/1991 | Hurst et al. | |
| 5,029,071 A | 7/1991 | Kinoshita | |
| 5,157,780 A | 10/1992 | Stewart et al. | |
| 5,548,601 A | 8/1996 | Kato et al. | |
| 5,594,646 A | 1/1997 | Itoh et al. | |

(Continued)

FOREIGN PATENT DOCUMENTS

| | | |
|---|---|---|
| DE | 42 18 418 | 12/1993 |
| DE | 4220247 | 12/1993 |

(Continued)

OTHER PUBLICATIONS

Farsi M et al: "An overview of controller are network" Computing & Control Engineering Journal IEE UK, vol. 10, No. 3, Jun. 1999, pp. 113-120, XP002506028 ISSN: 0956-3385.

(Continued)

*Primary Examiner* — Yolanda L Wilson
(74) *Attorney, Agent, or Firm* — Cozen O'Connor

(57) ABSTRACT

A microcontroller which can be coupled to an execution unit. For the operation of the microcontroller, a program in the microcontroller generates a message as a function of input data and transmits said message to the execution unit. For the operation of the microcontroller, accompanying the message, a check code is generated as a function of the execution of the program and is transmitted to the execution unit. For the operation of the execution unit, a test determines whether the check code is logically predefined and/or received within a predetermined time interval, wherein in the case of a positive test result, the message is designated as valid, and in the case of a negative result, the message is designated as invalid.

14 Claims, 4 Drawing Sheets

U.S. PATENT DOCUMENTS

| | | | | | |
|---|---|---|---|---|---|
| 5,654,888 | A | * | 8/1997 | Muller et al. | 701/54 |
| 5,684,702 | A | * | 11/1997 | Phillips et al. | 701/76 |
| 5,740,189 | A | * | 4/1998 | Tiedje | 714/807 |
| 5,917,840 | A | * | 6/1999 | Cheney et al. | 714/807 |
| 5,928,372 | A | * | 7/1999 | Yoshida | 714/704 |
| 6,125,454 | A | * | 9/2000 | Mossner et al. | 714/4.4 |
| 6,425,106 | B1 | * | 7/2002 | Higginson et al. | 714/759 |
| 7,539,903 | B2 | * | 5/2009 | Kolb et al. | 714/41 |
| 2004/0011579 | A1 | | 1/2004 | Heckmann et al. | |
| 2006/0150033 | A1 | | 7/2006 | Kolb et al. | |
| 2009/0193164 | A1 | * | 7/2009 | Ajanovic et al. | 710/107 |
| 2009/0327549 | A1 | | 12/2009 | Fuehrer | |

FOREIGN PATENT DOCUMENTS

| | | |
|---|---|---|
| DE | 102005021546 | 11/2006 |
| DE | 102005059021 | 6/2007 |
| DE | 102005061403 | 6/2007 |
| DE | 102007037232 | 2/2009 |
| EP | 0322141 | 6/1989 |
| EP | 0461792 | 12/1991 |
| EP | 0496509 | 7/1992 |
| EP | 0625751 | 11/1994 |
| EP | 1672505 | 6/2006 |
| WO | WO 02074596 | 9/2002 |
| WO | WO 2005001690 | 1/2005 |

OTHER PUBLICATIONS

Peter Mueller, Guido Löbel, Hans Schmid; Title on p. 492: "Paritätskontrolle", Title on p. 584: "Sicherungszeichen"; Lexikon der Datenverarbeitung; 9$^{th}$ revised and enlarged edition; published by Verlag Moderne Industrie; 1985; cover sheet, p. 492, p. 584; ISBN: 3-478-33209-05; Landsberg am Lech; Germany.

M. Farsi, K. Ratcliff, Manuel Barbosa; An Overview of Controller Area Network; Computing & Control Engineering Journal; vol. 10, No. 3; Jun. 1999; pp. 113-120; XP002506028; ISSN: 0956-3385; The University of Newcastle ; GB.

* cited by examiner

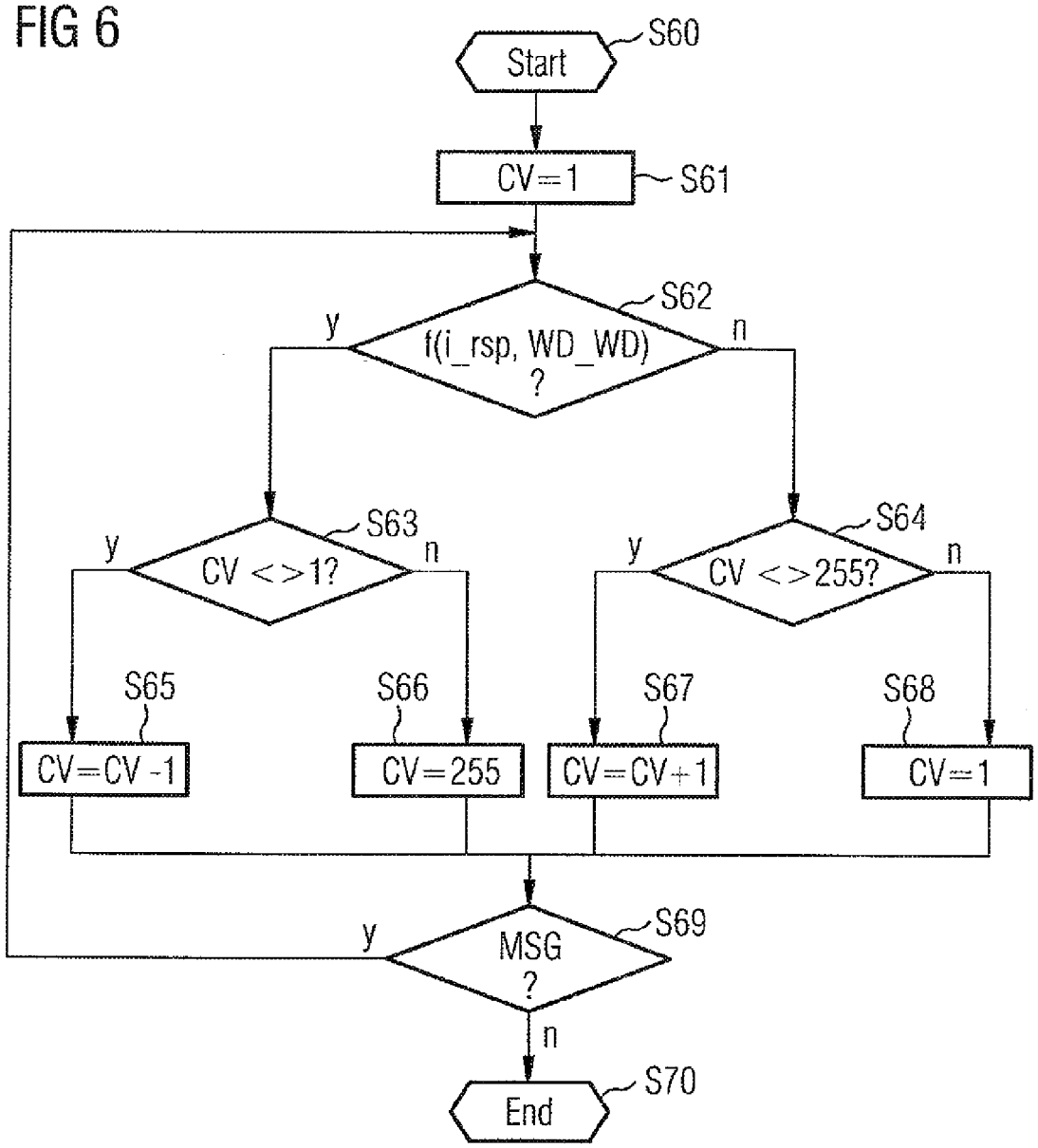

U.S. 8,392,815 B2

METHOD FOR THE OPERATION OF A MICROCONTROLLER AND AN EXECUTION UNIT AND MICROCONTROLLER AND AN EXECUTION UNIT

PRIORITY CLAIM

This is a U.S. national stage of application No. PCT/EP2008/056162, filed on 20 May 2008 which claims priority to the German Application No. 10 2007 029 116.9, filed 25 Jun. 2007; the content of both incorporated herein by reference.

BACKGROUND OF THE INVENTION

1. Field of the Invention

The invention relates to a method for operating a microcontroller and an execution unit, which can be coupled to one another, and to an appropriately designed microcontroller and an execution unit for carrying out the method.

2. Prior Art

In safety-related sensor circuits for motor vehicles equipped with a microcontroller, erroneous execution of the program in the microcontroller can result in erroneous processing of sensor data and hence in the transmission of erroneous processed sensor data. For example, these transmitted erroneous sensor data can be processed further in a braking system, such as an ESP or ABS controller, and hence can result in unwanted braking actions, which must be avoided with a high level of certainty.

WO 2005/001690 A2 discloses monitoring the running of the program in a microcomputer. In this case, in addition to the running of the program in the microcomputer, a copy of the program with the input data or test data provided for the program is processed and the output data from the copy are compared with those from the program, and an error message is produced if there is no match. In this connection, the document discloses that after the running of the program and after the running of program parts a respective flag is set or changed and that an error message is produced if not all of the flags are set or changed. This monitoring can be regarded as program flow monitoring. In addition, the document discloses monitoring the running of the program in at least two interconnected microcomputers of an electronic appliance, particularly a sensor circuit for motor vehicles. One microcomputer produces a challenge, which is sent to the other microcomputer here it uses prescribed input data to prompt a program to run and a response dependent on the output data is returned to the first microcomputer. One microcomputer compares the request and the response with one another. This monitoring can be regarded as challenge/response monitoring.

SUMMARY OF THE INVENTION

An object of the present invention is to provide a method for operating a microcontroller and an execution unit which is simple and inexpensive, and also an appropriately designed microcontroller and an execution unit for carrying out the method.

A method for operating a microcontroller, which can be coupled to an execution unit, in which input data is taken as the basis for using a program in the microcontroller to produce and transmit a message for the execution unit, and besides the message a check code is produced based on the execution of the program and is transmitted from the microcontroller to the execution unit. The check code, which is produced based on the execution of the program in the microcontroller, can easily indicate the execution of the program in a unit which is independent of the microcontroller, particularly in the execution unit. The execution unit is particularly suitable for receiving the check code because the execution unit is present in the motor vehicle in the form of a controller. The method can be implemented particularly inexpensively by a nonessential second microcontroller for monitoring the microcontroller.

In one advantageous embodiment, the message comprises the check code. Therefore, the message transmitted to the execution unit comprises not only the sensor data processed in the microcontroller but also the check code, which allows the transmission of the check code to be implemented particularly inexpensively.

A further advantageous embodiment includes a method in which the microcontroller comprises a monitoring unit that monitors the execution of the program and produces the check code. The monitoring unit associated with the microcontroller is used to monitor and ensure the correct execution of the program in the microcontroller, so that data produced as a result of erroneous execution of the program are flagged as erroneous by the check code. The monitoring unit may be integrated as an additional program part in the program of the microcontroller or may be integrated as a hardware functional module in the microcontroller.

A further advantageous embodiment is a method in which the execution of the monitoring unit is monitored and only in the event of a positive result for the monitoring is an error-free check code produced. For the purpose of monitoring the execution of the program by the monitoring unit, the monitoring unit is additionally monitored, so that sensor data produced from erroneous execution of the program or from overlooked erroneous execution of the program due to erroneous execution of the monitoring unit are flagged as invalid by the check code.

In a further embodiment, the check code is produced in a logically predefined fashion in the event of error-free execution of the program and is not produced in logically predefined fashion in the event of erroneous execution. By way of example, a logically predefined check code is produced by determining future values for the check code based on of previously transmitted values of the check code. The logically predefined check code allows particularly suitable prediction of the check code to be received in the execution unit and hence flagging of error-free execution of the program, while a check code which is not logically predefined is not consistent with the prediction in the execution unit and therefore flags erroneous execution of the program and flags the transmitted message as invalid.

In a further embodiment, the check code is produced in a logically predefined fashion by an up and/or down counter. This refinement allows particularly simple prediction of the check code to be received in the event of erroneous execution of the program and particularly simple implementation in terms of program and hardware. As an alternative to counting up and/or down, it is possible, for example in the event of an erroneous check code to prescribe the value of the check code for the previous transmitted message, so that in this case the value of the check code cannot be changed by the counting up and/or down. In addition, it is also possible to prescribe a fixed value for an erroneous check code, for example a value of zero.

In line with a further embodiment, the check code is transmitted in a predetermined time interval. This makes it possible to identify and flag erroneous execution of the program, for example what is known as hanging of the program and associated lack of or delayed transmission of the message.

In line with a further embodiment, the microcontroller comprises a hardware monitoring unit which is actuated by the monitoring unit at predetermined times, wherein the microcontroller is reset by the hardware monitoring unit if the predetermined time is not reached or is exceeded. This makes it possible to identify erroneous execution of the program and/or of the monitoring unit, for example so-called hanging of the program and/or the monitoring unit as a result of the lack of actuation of the hardware monitoring unit, with particular certainty and to restart the execution of the program by virtue of the resultant resetting of the microcontroller.

In addition, the invention is distinguished by a method for operating an execution unit which can be coupled to a microcontroller based on the illustrated refinements, in which a check is performed to determine whether the check code is logically predefined and/or the check code has been received within the predetermined time interval, wherein the message is flagged as valid if the result of the check is positive and the message is flagged as invalid if the result is negative. The execution unit is particularly suitable for receiving the check code because it is most often present in motor vehicles in which sensor circuits are coupled to controllers, which can be regarded as a type of execution unit, and operates independently of the microcontroller in the sensor circuit. The execution unit performs a check to determine whether the received check code from the microcontroller is logically predefined and/or has been received within the predetermined time interval. The message associated with the check code is flagged as valid or invalid in line with the result of the check. Messages flagged as invalid can be ignored in the execution unit, for example, and/or a further message can be used by the execution unit to notify the microcontroller that erroneous messages have been received.

A further advantageous embodiment is distinguished by a microcontroller that can be coupled to an execution unit and is designed to take input data as a basis for using a program in the microcontroller to produce and transmit a message for the execution unit. In addition, the microcontroller is designed to produce, besides the message, a check code based on the execution of the program and to transmit it from the microcontroller to the execution unit. The design of the microcontroller to produce the check code allows the latter to be produced particularly advantageously and particularly quickly without affecting the execution of the program in a manner critical to timing. In addition, the production of the check code in the microcontroller is particularly easy to implement, for example if the check code is logically predefined by an up and/or down counter.

In line with a further embodiment, the microcontroller comprises a monitoring unit designed to monitor the execution of the program and to produce the check code. The monitoring unit allows particularly fast monitoring of the execution of the program and particularly fast production of the check code without affecting the execution of the program in a manner critical to timing.

In line with a further embodiment, the microcontroller comprises a further monitoring unit which is designed to monitor the monitoring unit and to produce an error-free check code only if the result of the monitoring is positive. The further monitoring unit for monitoring the monitoring unit which monitors the execution of the program particularly increases the ability to identify erroneous execution of the program and additional erroneous execution of the monitoring unit and to indicate this to the execution unit by means of check codes. This prevents erroneous processed sensor data from being processed, and in the case of a braking system in a motor vehicle avoids unwanted braking action with particular certainty.

A further embodiment is distinguished by an execution unit that can be coupled to a microcontroller based on the refinements shown and comprises an evaluation unit which is designed to check whether the check code is logically predefined and/or the check code has been received within the predetermined time interval, wherein the evaluation unit flags the message as valid if the result of the check is positive and flags the message as invalid if the result is negative. In this case, the evaluation unit allows the check code to be checked, particularly easily and quickly, to determine whether it is logically predefined and/or has been received within the predetermined time interval. The evaluation unit can flag an error-free and/or erroneous check code as valid and/or invalid using flags and/or using at least one interrupt trigger. The messages flagged as erroneous by flags can be ignored, for example.

In a farther embodiment, the invention is distinguished by a system that comprises a microcontroller based on the illustrated embodiments and an execution unit, coupled to the microcontroller, based on the illustrated embodiment. This results in a particularly suitable system for monitoring the execution of the program in the microcontroller which can be implemented easily and inexpensively.

BRIEF DESCRIPTION OF DRAWINGS

Exemplary embodiments of the invention are explained in more detail below with reference to the schematic drawings, in which:

FIG. 6 is a flowchart for production of a check code.

Elements having the same or similar design or function are identified by the same reference symbols throughout the Figures.

DETAILED DESCRIPTION OF THE DRAWINGS

Figure 1:
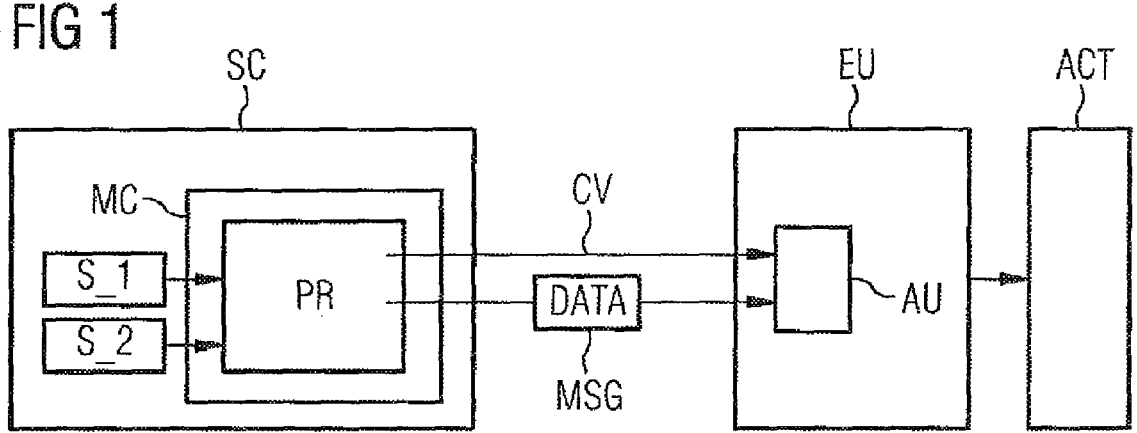
FIG. 1 is a schematic illustration of a system with a microcontroller and an execution unit.

A sensor circuit SC shown in FIG. 1 comprises a microcontroller MC which receives sensor data S_1 and S_2, corresponding to data from a transverse acceleration sensor and a rotary rate sensor in a motor vehicle, and processes them using a program PR. The processed sensor data DATA is transmitted by a message MSG to an execution unit EU that is independent of the microcontroller MC. By way of example, the execution unit EU may be in the form of an ESP controller that processes the received sensor data further and takes them as a basis for actuating brakes in the motor vehicle using brake actuators ACT. The execution unit EU additionally comprises an evaluation unit AU. Besides the message MSG, a check code CV is produced based on the execution of the program PR by the program PR itself and is forwarded to the evaluation unit AU associated with the execution unit EU. In this case, the check code CV flags the data DATA contained in the message MSG transmitted in parallel with said check code as valid or invalid based on the execution of the program PR in the microcontroller MC. Error-free execution and the production of error-free data DATA is indicated to the execution unit EU by an error-free check code CV, while erroneous data DATA in the message MSG are indicated to the execution unit EU by an erroneous check code CV.

Figure 2:
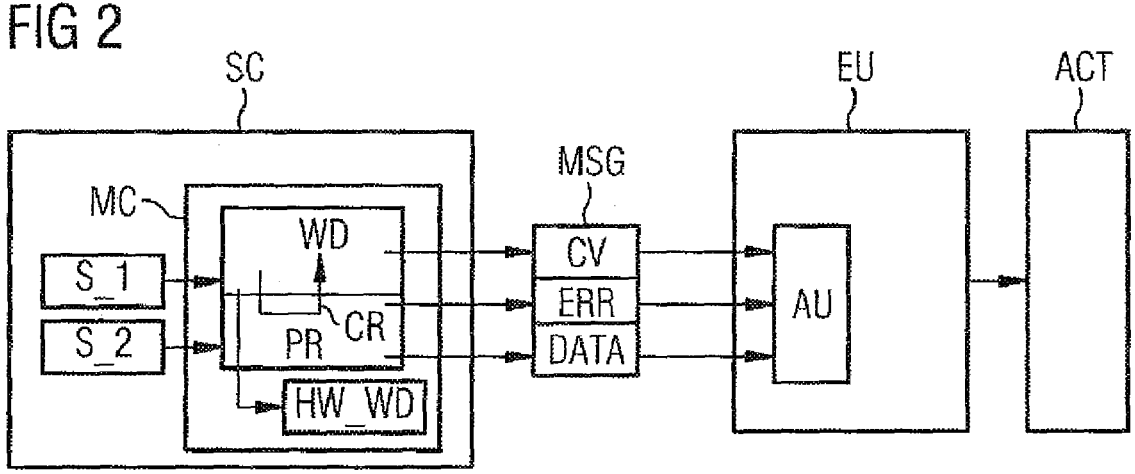
FIG. 2 is a further schematic illustration of the system with a microcontroller and an execution unit.

In a further exemplary embodiment shown in FIG. 2, the microcontroller MC comprises not only the program PR but also a monitoring unit WD and a hardware monitoring unit HW_WD. The monitoring unit WD may be integrated within the microcontroller MC in the program PR as an additional program part or as a hardware functional module. The monitoring unit WD monitors the program PR in the microcontroller MC using challenge/response monitoring CR wherein the monitoring unit WD produces a challenge and transmits it to the program PR. Input data associated with the challenge is used to execute the program PR, and the output data resulting from the execution of the program PR is associated with a response that is transmitted back to the monitoring unit WD and compared with a prescribed response there. If the responses do not match, the check code CV can be produced by the monitoring unit WD such that erroneous execution of the program PR is indicated to the evaluation unit AU associated with the execution unit EU, and the evaluation unit AU ignores the processed sensor data DATA received by the message MSG. The message MSG in this exemplary embodiment comprises not only the processed sensor data DATA but also the check code CV. In the case of a motor vehicle, the message MSG may correspond to a controller area network (CAN) message, for example.

In this connection, it should be pointed out that the message MSG additionally comprises an error code ERR which indicates internal faults and errors in the sensor circuit SC, such as voltage fluctuations, to the execution unit EU. The execution unit EU can use the faults and errors indicated by error code ERR to flag the message as valid and/or invalid.

The hardware monitoring unit HW_WD associated with the microcontroller MC is actuated by the monitoring unit WD at predetermined times, wherein in the absence of actuation or if the predetermined times are not reached or are exceeded, the microcontroller MC is reset by the hardware monitoring unit HW_WD and the execution of the program PR is restarted.

Figure 3:
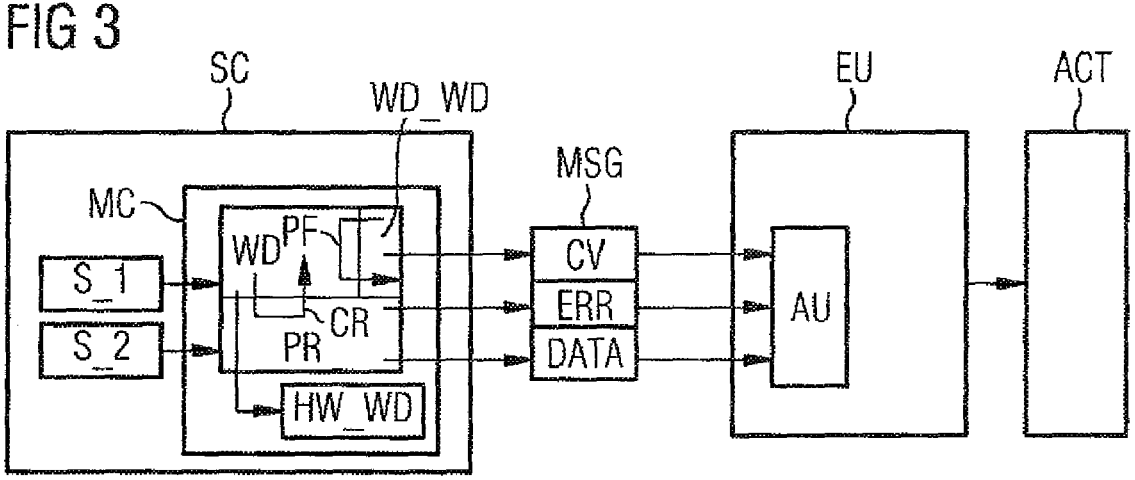
FIG. 3 is a further schematic illustration of the system with a microcontroller and an execution unit.

In FIG. 3, the microcontroller MC in the sensor circuit SC comprises not only the monitoring unit WD but also a further monitoring unit WD_WD which monitors the execution of the monitoring unit WD. The further monitoring unit WD_WD may be integrated in the program PR as an additional program part of the microcontroller MC or in the microcontroller as a further functional module. The further monitoring unit WD_WD may be designed for program flow monitoring PF so that flags are set or changed during the execution of the monitoring unit WD. The further monitoring unit WD_WD flags erroneous execution of the monitoring unit WD using the flags by virtue of not all the flags being set or changed. The check code CV associated with the message MSG can be used to notify the evaluation unit AU associated with the execution unit EU of the erroneous execution of the monitoring unit WD and to ignore the processed sensor data DATA received by message MSG.

Figure 4:
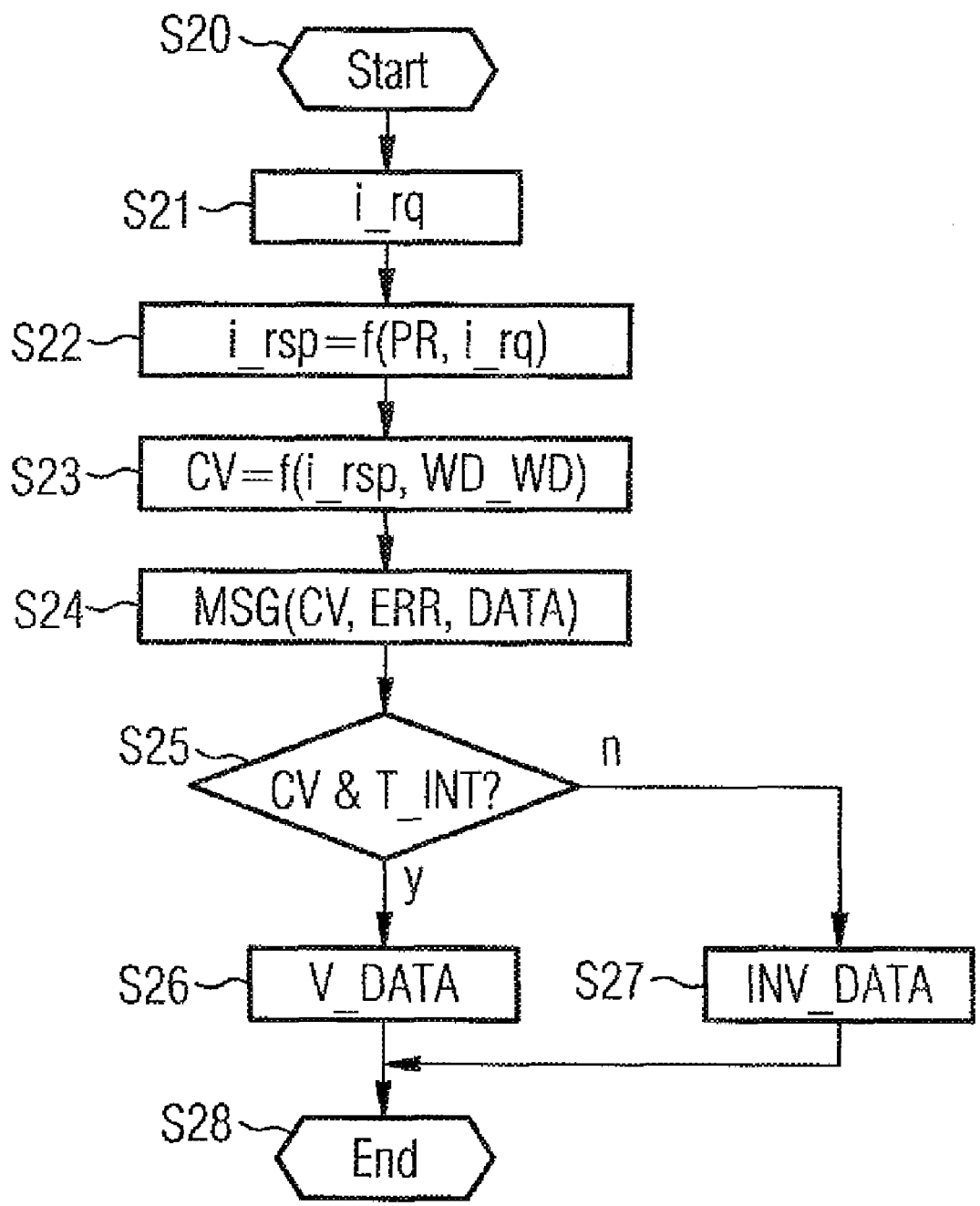
FIG. 4 is a flowchart for monitoring of execution of a program.

In FIG. 4, a flowchart shows that a program is started in a step S20. In a step S21, the monitoring unit WD, for example, transmits a request index i_rq to the program PR for the purpose of challenge/response monitoring CR. Using input data associated with the request index i_rq, the program PR is executed and output data are produced. Based the output data produced, step S22 involves a response index i_rsp being produced that is transmitted back to the monitoring unit WD and is compared with a prescribed response index. Based on the comparison and the result of the monitoring of the execution of the monitoring unit WD by the further monitoring unit WD_WD, a step S23 involves the check code CV being produced, which is logically predefined for error-free execution of the program and is not logically predefined for erroneous execution of the program. In a step S24, the check code CV is associated with the message MSG and is transmitted to the execution unit EU in addition to the processed sensor data DATA and the error code ERR. In a step S25, the received check code CV is then checked in the execution unit EU to determine whether it is logically predefined and/or has been transmitted and/or received within the predetermined time interval T_INT. If the check code CV has been logically predefined and/or transmitted within the predetermined time interval, the processed sensor data DATA is flagged as valid sensor data V_DATA in a step S26. This data can be processed further in the execution unit EU. If the check code CV is not logically predefined and/or if the check code CV has been transmitted and/or received outside of the predetermined time interval, the processed sensor data DATA are flagged as invalid sensor data INV_DATA in a step S27 and can be ignored, for example.

Figure 5:
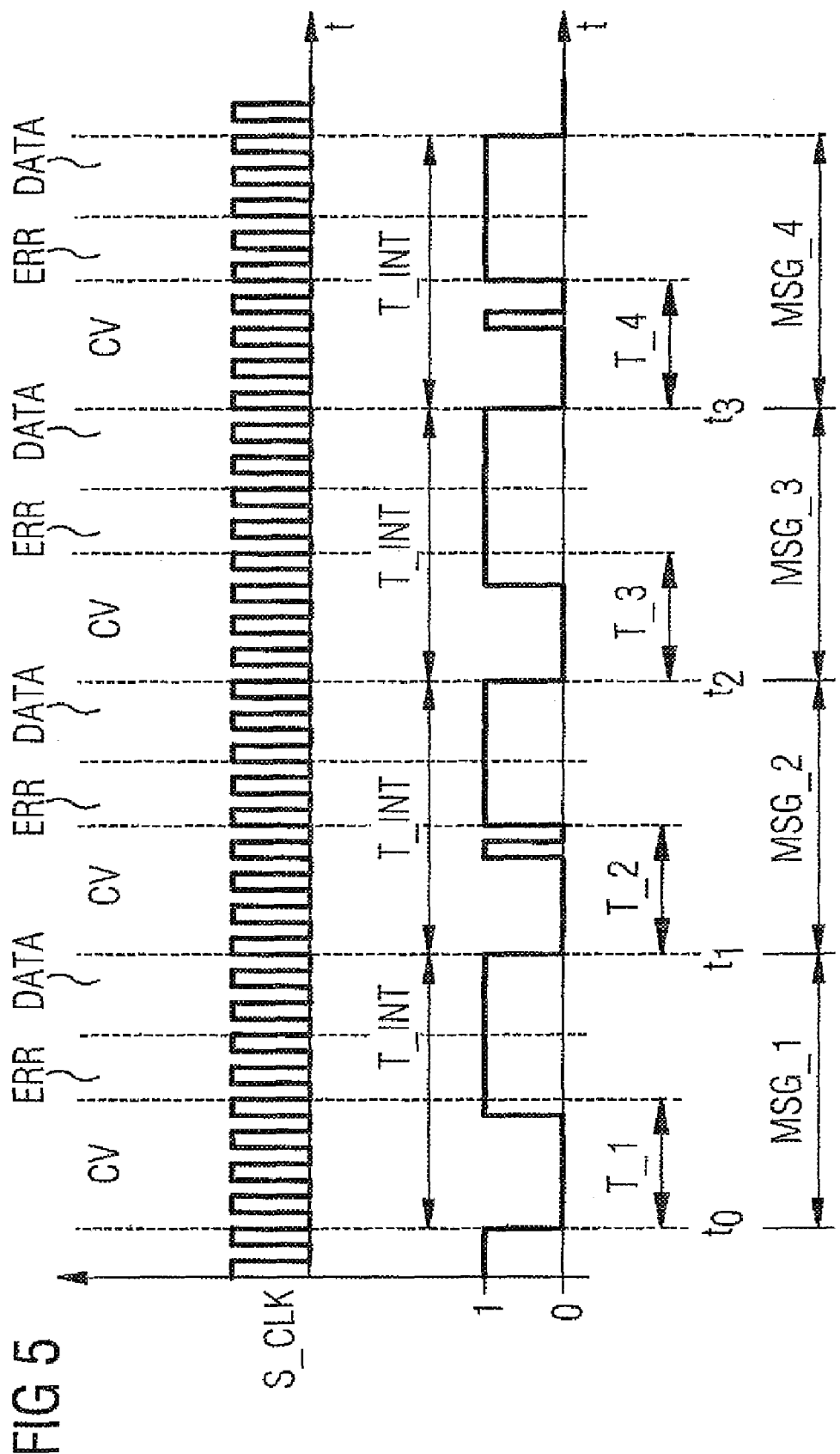
FIG. 5 is a time profile for a check code.

FIG. 5 shows the time profile for the message MSG, wherein the message MSG comprises the check code CV, the error code ERR and the processed sensor data DATA. FIG. 5 shows a reference signal with the clock signal S_CLK, said reference signal needing to be used to simplify the description of the message profile MSG and being able to be regarded as representation of a bit time. The error code ERR and the processed sensor data DATA in the messages MSG_1, MSG_2, MSG_3 and MSG_4 are shown by way of example in FIG. 5. At a time t0, the first message MSG_1 is transmitted to the execution unit EU. It contains the check code CV, the error code ERR and the processed sensor data DATA. The check code CV comprises a first time period T_1, which corresponds to 8 bit times. The first message MSG_1 comprises the check code CV with the value 1, which is represented in binary within the time period T_1. The second message MSG_2 is transmitted at a time t1. The second message MSG_2 comprises not only the error code ERR shown by way of example and the processed sensor data DATA shown by way of example but also the check code CV with the value 2, which is represented in binary within the time period T_2. The third and fourth messages MSG_3 and MSG_4 are accordingly transmitted at the times t3 and t4 and respectively contain the check code CV with the values 3 and 4, which in both messages MSG_3 and MSG_4 are represented in binary in the time periods T_3 and T_4. The values of the check code CV in the illustrated messages MSG_1, MSG_2, MSG_3 and MSG_4 are transmitted for the purpose of an up counter, and for a check code CV which comprises 8 bit times it is possible to increment up to a maximum value of 255, restarting at 1 again following a counter overflow. A value 0 for the check code CV can be reserved for the microcontroller MC to flag erroneous execution of the program PR to the execution unit EU for example. The predetermined time interval T_INT is shown in FIG. 5 as a time period for a transmission time for a message MSG, for example, within which time interval a message MSG should be transmitted.

In FIG. 6, the production of the error-free and/or erroneous check code CV, as executed in the further monitoring unit WD_WD, for example, is started in step S60. The description for FIG. 6 is based on an 8-bit value for the check code CV, for example, which can be incremented up to a value of 255 maximum. In a step S61, a 1 is prescribed for the check code CV. In a step s62, a check is performed to determine whether an error-free or erroneous check code CV needs to be produced. The check can be performed using the comparison—shown in FIG. 4—of the response index i_rsp with a prescribed response index and using the result of the monitoring of the monitoring unit WD by the further monitoring unit WD_WD. If the check is used to decide that an erroneous check code CV needs to be produced, a check is first of all performed in a step S63 to determine the value of the current check code CV. If the value of the check code CV is not equal to 1, the current value of the check code CV is decremented by 1 in a step S65. If the value of the check code CV in step S63 is equal to 1, a value 255 is prescribed for the check code CV in a step S66. As an alternative to steps S63, S65 and S66, an unaltered value of the check code CV can be prescribed for the erroneous check code CV, said value matching the value of the check code CV for a previous transmission of the message MSG, for example. The production of the unaltered value of the check code CV can be used to indicate to the execution unit EU, in the event of the execution of the program PR "hanging", that the execution of the program PR is stopping and the processed sensor data DATA could be erroneous.

If the result of the check in step S62 is production of an error-free check code CV, a check is first of all performed in a step S64 to determine whether the value of the check code CV is not equal to 255. If this is the case then the value of the check code CV is incremented by 1 in a step S67. If the value of the check code CV is equal to 255 in step S64, the value of the check code CV is prescribed 1 in a step S68. By way of example, the check code CV produced here could be transmitted by means of the illustrated transmission in FIG. 5.

In a step S69, a check is performed to determine whether further messages MSG need to be transmitted and hence further check codes CV need to be produced on the basis of the already transmitted check codes CV. If no further messages MSG need to be transmitted, the production of the check code CV is terminated in a step S70.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a microcontroller, couplable to an execution unit, comprising:
    producing in the microcontroller a message using a program, the message based at least in part on sensor input data;
    transmitting the message to the execution unit;
    producing a check code based at least in part on execution of the program; and
    transmitting the check code to the execution unit,
    wherein the check code is transmitted in a predetermined time interval.

2. The method as claimed in claim 1, wherein the message comprises the check code.

3. The method as claimed in claim 1, wherein the microcontroller comprises a monitoring unit configured to produce the check code, the method further comprising:
    monitoring execution of the program by the monitoring unit; and
    producing by the monitoring of the monitoring unit.

4. The method as claimed in claim 3, further comprising monitoring execution of the monitoring unit; and producing an error-free check code only in the event of a positive result for the monitoring.

5. The method as claimed in claim 1, wherein the check code is produced in a logically predefined fashion for an error-free execution of the program and is not produced in the logically predefined fashion in the event of erroneous execution of the program.

6. The method as claimed in claim 5, wherein the check code is produced in logically predefined fashion by at least one of an up counter and a down counter.

7. The method as claimed in claim 1, further comprising:
    checking by the execution unit to determine at least one of:
        whether the check code is logically predefined and
        whether the check code has been received within a predetermined time interval; and
        flagging the message as valid if the result of the check is positive and the message is flagged as invalid if the result is negative.

8. The method as claimed in method 1, wherein the execution unit is configured to operate an actuator based at least in part on the sensor input data.

9. A method for operating a microcontroller, couplable to an execution unit, comprising:
    producing in the microcontroller a message using a program, the message based at least in part on sensor input data;
    transmitting the message to the execution unit;
    producing a check code based at least in part on execution of the program; and
    transmitting the check code to the execution unit
    wherein the microcontroller comprises a monitoring unit configured to produce the check code, the method further comprising:
    monitoring execution of the program by the monitoring unit; and
    producing by the monitoring of the monitoring unit,
    wherein the microcontroller comprises a hardware monitoring unit, the method further comprising:
    actuating the hardware monitoring unit by the monitoring unit at predetermined times; and
    resetting the microcontroller by the hardware monitoring unit if the predetermined time is not one of reached and exceeded.

10. A microcontroller configured to be coupled to an execution unit, the microcontroller further configured to execute a computer program stored on a nontransitory computer readable medium that causes the microcontroller to:
    produce a message based at least in part on sensor input data using a program;
    transmit the message to the execution unit;
    produce a check code based at least in part on execution of the program; and
    transmit the check code to the execution unit,
    wherein the check code is transmitted in a predetermined time interval.

11. The microcontroller as claimed in claim 10, further comprising a monitoring unit configured to monitor the execution of the program and produce the check code.

12. The microcontroller as claimed in claim 11, further comprising a further monitoring unit configured to monitor the monitoring unit and to produce an error-free check code only if the result of the monitoring is positive.

13. An execution unit configured to be coupled to a microcontroller, the execution unit comprising:
 an evaluation unit configured to check at least one of:
  whether a check code produced by the microcontroller is logically predefined and transmitted in a predetermined time interval,
  whether the check code was been received within a predetermined time interval,
 wherein the evaluation unit is configured to flag a message produced by the microcontroller as valid if the result of the evaluation is positive and flag the message as invalid if the result is negative.

14. A system comprising a microcontroller as claimed in claim 10 and an execution unit, coupled to the microcontroller, as claimed in claim 13.

* * * * *